United States Patent
Richmond, III et al.

(10) Patent No.: US 12,554,848 B2
(45) Date of Patent: Feb. 17, 2026

(54) RULE GENERATION USING ENTROPY PROFILE FOR MALWARE DETECTION

(71) Applicant: Salesforce, Inc., San Francisco, CA (US)

(72) Inventors: Dewey Roosevelt Richmond, III, Ashburn, VA (US); Ian Davis, Canyon Lake, TX (US); Mimi Wang, San Diego, CA (US)

(73) Assignee: Salesforce, Inc., San Francisco, CA (US)

( * ) Notice: Subject to any disclaimer, the term of this patent is extended or adjusted under 35 U.S.C. 154(b) by 64 days.

(21) Appl. No.: 18/629,697

(22) Filed: Apr. 8, 2024

(65) Prior Publication Data

US 2025/0315523 A1   Oct. 9, 2025

(51) Int. Cl.
 *G06F 21/56* (2013.01)

(52) U.S. Cl.
 CPC .................... *G06F 21/56* (2013.01)

(58) Field of Classification Search
 CPC ....................................... G06F 21/56
 See application file for complete search history.

(56) References Cited

U.S. PATENT DOCUMENTS

| | | | | |
|---|---|---|---|---|
| 2014/0237600 A1* | 8/2014 | Silberman | ............ | G06F 21/56 726/24 |
| 2016/0359881 A1* | 12/2016 | Yadav | ............ | H04L 9/0866 |
| 2019/0190926 A1* | 6/2019 | Choi | ............ | H04L 63/1425 |
| 2020/0334095 A1* | 10/2020 | Xu | ............ | G06F 11/076 |
| 2020/0410095 A1* | 12/2020 | Guan | ............ | G06F 18/22 |
| 2023/0208872 A1* | 6/2023 | Fitzgerald | ............ | G06F 40/20 726/23 |

OTHER PUBLICATIONS

"Math module", Yara, Retrieval date: Apr. 8, 2024. Retrieved from internet: https://yara.readthedocs.io/en/latest/modules/math.html (Copyright Year: 2014-2022).

Mike Harbison and Peter Renals, Russian APT29 Hackers Use Online Storage Services, DropBox and Google Drive, https://unit42.paloaltonetworks.com/cloaked-ursa-online-storage-services-campaigns, Jul. 19, 2022.

* cited by examiner

*Primary Examiner* — Khoi V Le
(74) *Attorney, Agent, or Firm* — Kwan & Olynick LLP

(57) ABSTRACT

In some embodiments, a method receives a file. The file is packed using a packing method. An entropy profile is generated for the file. The entropy profile describes an entropy of data over positions in the file. The method generates a rule to detect the entropy profile of the file by analyzing entropy values from the entropy profile in slices in the file. The rule is output. The rule is usable to detect in other files that use the packing method based on analyzing entropy in slices of the other files.

20 Claims, 10 Drawing Sheets

RULE GENERATION USING ENTROPY PROFILE FOR MALWARE DETECTION

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to file analysis and more specifically to rule generation for malware detection using entropy profiles.

BACKGROUND

The detection of malicious software (e.g., malware) is important to protect computer systems, networks, or data. A malware service may be employed to detect malware. In some examples, rules may be written for the malware service to detect matches on clear text strings. Clear text strings may be text or data that may not be encoded, such as encrypted or obfuscated. However, a malware actor may change a small amount of data in multiple malicious files, which then may avoid the rules that are looking for matches on clear text strings. The malicious files may then avoid the detection of the malware service, and can cause unauthorized access to computer systems, networks, or data.

BRIEF DESCRIPTION OF THE DRAWINGS

The included drawings are for illustrative purposes and serve only to provide examples of possible structures and operations for the disclosed inventive systems, apparatus, methods and computer program products for rule generation. These drawings in no way limit any changes in form and detail that may be made by one skilled in the art without departing from the spirit and scope of the disclosed implementations.

DETAILED DESCRIPTION

System Overview

A malware detection system may use an entropy profile of a file to generate rules to detect malicious software, such as other files with a similar entropy profile. Although malware detection is described, the system can be used to determine if two files are similar or packed in the same way, verify or authenticate files, etc. An entropy profile may represent an entropy distribution of data over positions in a file. Entropy may measure the randomness of data in the file at the different positions. A high entropy value may indicate a high degree of randomness and a low entropy value may indicate predictability or repeated values. For example, on a scale from 0-8, a value of 8 may represent a completely random string of data, and a value of 0 may indicate no randomness (e.g., all bytes in the data have the same value). In general, standard English text may have an entropy value between 3.5 and 5, and encoded data (e.g., encrypted or compressed) in a window may have an entropy over 7.5.

The malware detection system may generate a rule that detects entropy for different slices in a file that is considered malicious. The malware detection system can then analyze other files to determine if the files should be considered malicious. For example, the malware detection system may generate an entropy profile for a current file. Then, entropy values in the entropy profile for the current file are compared to the rule. If it is determined that the current file matches the rule, the malware detection system may flag the current file as being malicious.

The use of the entropy profile to detect malicious files may be an improvement in the detection process. For example, a malicious actor may generate multiple files that may have changed some values in the data. However, the malicious actor may use the same packing method to encode the files. The encoding of the files may change the data of the files, such as encrypting, obfuscating, compressing, etc. the clear text data. Because there may be a large number of files that need to be packed, the malicious actor may use the same packing method. The resulting files may end up with a similar entropy profile because they have been packed the same even though the files may have different clear text data in them. Accordingly, a clear text string rule may not be able to detect the files as being malicious because the files have different data and may not meet the rule. Also, encoded files may need to be decoded (e.g., uncompressed or decrypted) before applying the cleartext rule. However, using a rule that detects the entropy of the files may be able to detect that these files may be malicious due to the same packing method being used. That is, using the same packing method results in a similar entropy profile even if some clear text data is different in multiple files. Using the entropy profile thus improves the detection of malicious files.

System

Figure 1:
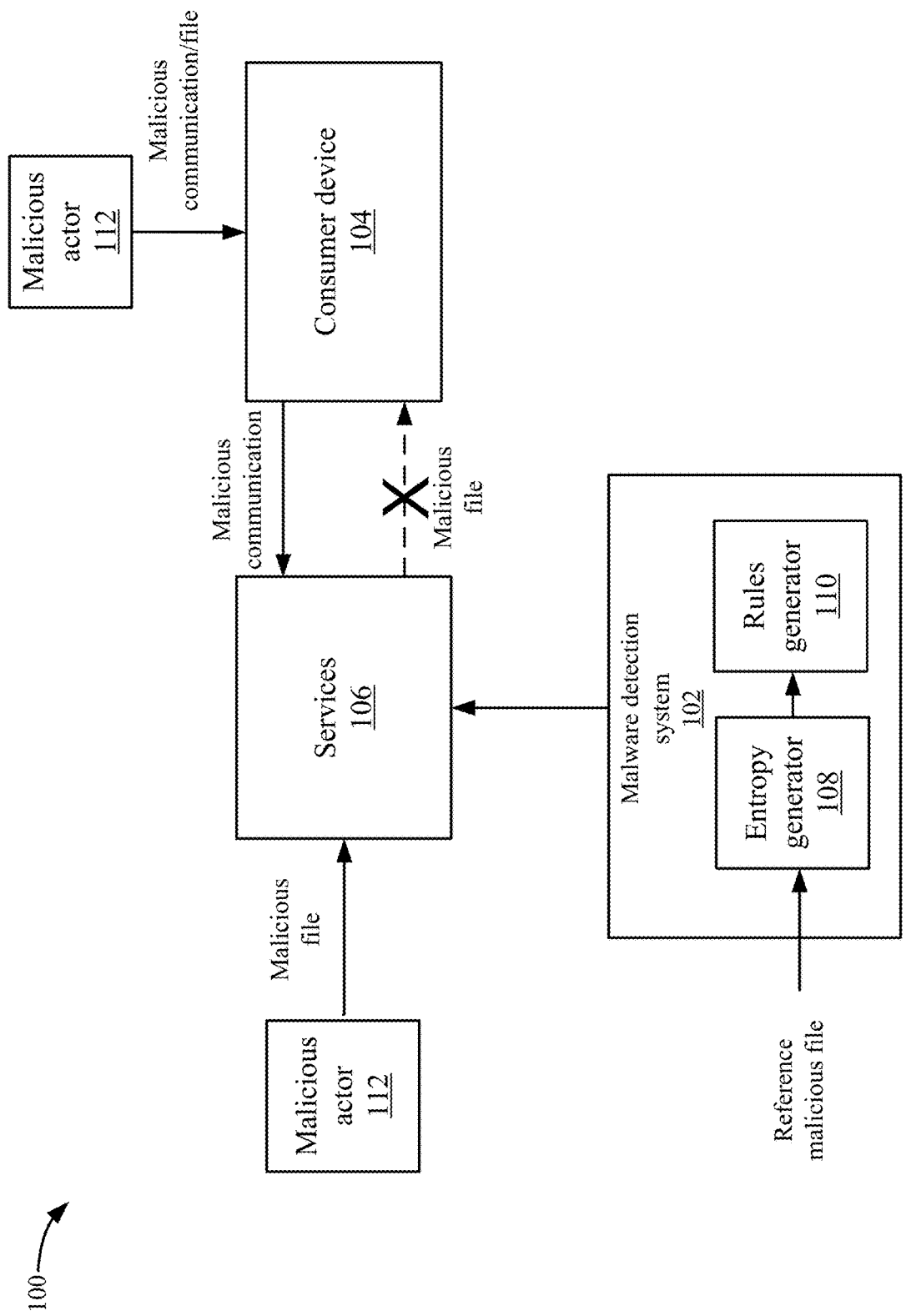
FIG. 1 depicts a simplified system for detecting malicious software according to some embodiments.

FIG. 1 depicts a simplified system 100 for detecting malicious software according to some embodiments. A malware detection system 102 may detect malicious software, such as within a network. In some embodiments, the network may include multiple computing devices, such as consumer devices 104 that may be using services 106 that are implemented using servers, databases, etc. Consumer devices 104 may be client devices being used by users or other devices that are consuming services. Services 106 may be services offered by the network, which may include messaging services, cloud storage services, applications, and other services.

Malware detection system 102 may be used to detect malicious files. The malicious files may be received using different malicious processes. In some embodiments, a process referred to as a dead drop may be used by a malicious actor. Although a dead drop process is described, other malicious processes may be detected. In the dead drop process, the malicious process may include many stages. It may be hard to detect malicious files when the process includes many stages. The dead drop attack is where a malicious actor may strategically deposit later-stage malicious payloads on trusted sites to evade detection. The attacks typically involve a malicious actor 112 sending phishing communications to victims using consumer devices 104, and once the files in the phishing communications are opened, the files download other files, unpack the files, and execute malicious payloads that have been stored on the trusted services 106. This is an issue because these payloads may not be stand-alone executables, which means detonating them in a sandbox may not be effective. The payloads are also highly encoded, which makes the manual analysis by detecting clear text ineffective, and also the manual analysis is difficult without having all stages of the attack available. The malicious files that are received are the files that can be analyzed. The files may be useless without an install agent that is used to unpack the files. That is, the files cannot be unpacked and then a clear text rule applied to the decoded information of the files. The files are also generated to evade popular antivirus solutions that use clear text matching.

In one example of a dead drop process, consumer device 104 may receive a malicious communication from malicious actor 112, such as an email with an attachment file. The file may send a beacon to a service 106, such as a cloud storage account. Then, a malicious file, which may be an ISO image file, may be returned to consumer device 104. The malicious file may then execute processes that may download malicious files, such as starting an executable process that downloads a malicious file (e.g., a dynamic link library (DLL) that contains software code that can be used by a malicious program). Then, the DLL may be used to decompress and execute a payload of malicious files. The result may be a communication with a malicious actor that may perform malicious actions, such as taking control of consumer device 104 to access the network. Although the above malicious attack is described, other malicious attacks may be detected using malware detection system 102. For example, malware detection system 102 may be used to scan files that are received at an ingress point of the network.

The use of the entropy profile may improve the malware detection process. For example, the malicious files do not need to be unpacked to detect malware. Rather, the entropy profile for the unpacked files can be used. In the process, a reference malicious file may be determined. The reference malicious file may be determined to be malicious using different methods. Then, an entropy generator 108 may generate an entropy profile for the reference malicious file. The entropy profile may describe entropy values as a function of file size for the file, such as for slices in the file. The slices may be one or more bytes in the file, such as file or byte offsets. The positions may be file offsets where specific bytes or data are stored in the file. As described above, the entropy may be a measurement of randomness for the positions in the file. Different methods may be used to measure the entropy, which may be a measure of entropy for a position using the entropy of data that is within a window. For example, a sliding window around positions in the file may be used to determine entropy values for the positions.

A rules generator 110 receives the entropy profile and can generate a rule that is used to detect other malicious files that are received in the network. In some embodiments, the rule may include slices that analyze portions of the file. For example, at different slices, entropy values may be included for the rule. A slice may be associated with a range of positions (e.g., bytes X to Y) or a single position (e.g., byte Z). The slices may be a pre-set size (e.g., Z bytes) or may vary in size (e.g., slices may be larger when entropy values are not changing very much and smaller when entropy values are changing faster). In some examples, at a slice #1, an entropy value may be included. The entropy value may be a range, such as an entropy range from 7.5 to 7.7. Also, at another slice #2, the entropy value may include a range of 6.6 to 6.8. The rule may include multiple slices that cover the positions of the file (e.g., all of the positions that include data). Other information for the rule may also be included, such as a threshold of how many of the slices of the rule need to be matched to consider the current file as malicious. Also, the rule may include an action to perform, such as quarantining the file, sending an alert, or performing other actions.

Malware detection system 102 may output the rule for use in detecting malware. For example, when a current malicious file is received at services 106 from malicious actor 112, malware detection system 102 may generate an entropy profile for the current malicious file. Then, the entropy profile is compared to the rule to determine whether the rule is met, such as a number of slices of the entropy profile meet corresponding slices of the rule. If the rule is met, then malware detection system 102 may perform an action associated with the rule. For example, the file may be quarantined. If the rule is not met, then the action for the rule may not be performed. Depending on the number of rules that are used, if no other more rules are met, the file may be allowed on the system. If the current malicious file is detected and not allowed onto services 106, then the sending of the malicious file to consumer device 104 may not occur as described above when the malicious communication is received at consumer device 104. Here, the malicious file is not sent to consumer device 104 thereby thwarting the attack.

Accordingly, malware detection system 102 may be improved and may be able to detect more malicious files compared to if the entropy profile is not used. If only a portion of the file is used, there may be more false positives. However, using the entropy profile of the entire file may detect when the same packing method is used by malicious actor 112 on multiple files. The packing method is used on the entire file and using the entropy profile of the entire file may accurately detect malicious files. Also, using an entropy profile for the entire file may be an improvement in detecting malicious files. For example, translating the entropy profile from a known malicious file into a rule that includes multiple slices for positions in the file may cause less false positives because the slices provide a granular detection method.

The following will discuss the generation of rules, and the use of the rules to detect malicious files according to some embodiments.

Rule Generation

Figure 2:
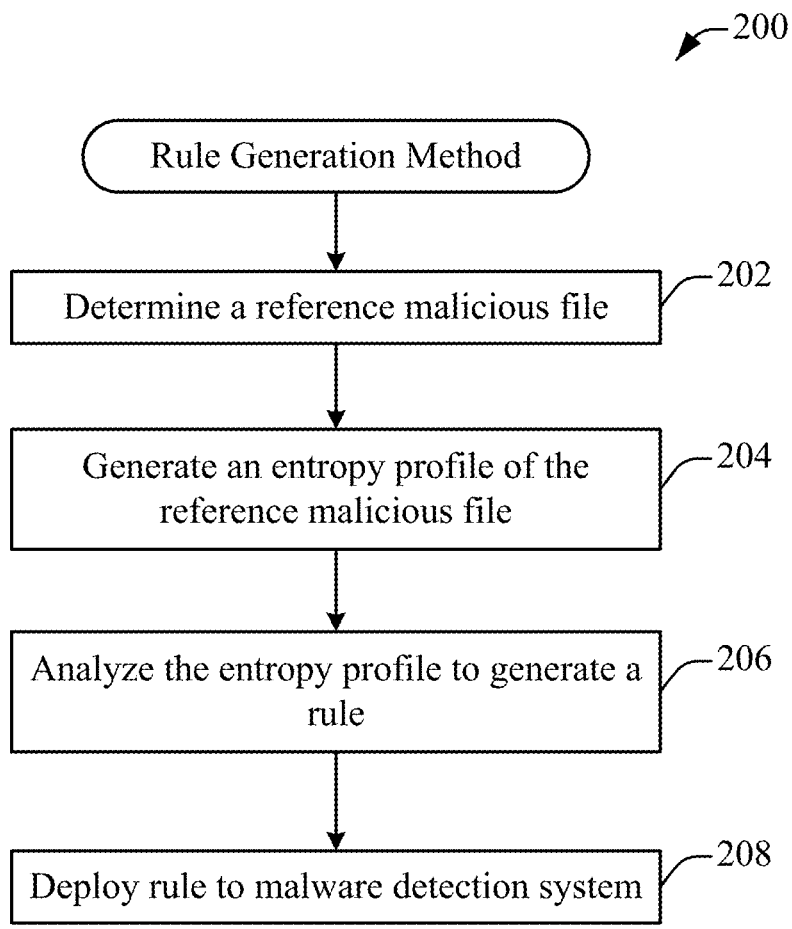
FIG. 2 depicts a simplified flowchart of a method for generating rules for a malware detection system according to some embodiments.

FIG. 2 depicts a simplified flowchart 200 of a method for generating rules for malware detection system 102 according to some embodiments. At 202, malware detection system 102 determines a reference malicious file. The reference malicious file may be determined using different processes. For example, a system may determine that a file is malicious, and may want to detect other files like it.

At 204, malware detection system 102 generates an entropy profile of the reference malicious file. An example of an entropy profile will be described in FIG. 3. In some embodiments, the entropy profile may determine entropy values for multiple slices in the file, where a slice is associated with a range of file offsets. Different methods may be used to generate the entropy profile, such as using a window around a position to determine the randomness of data within the window.

Figure 4:
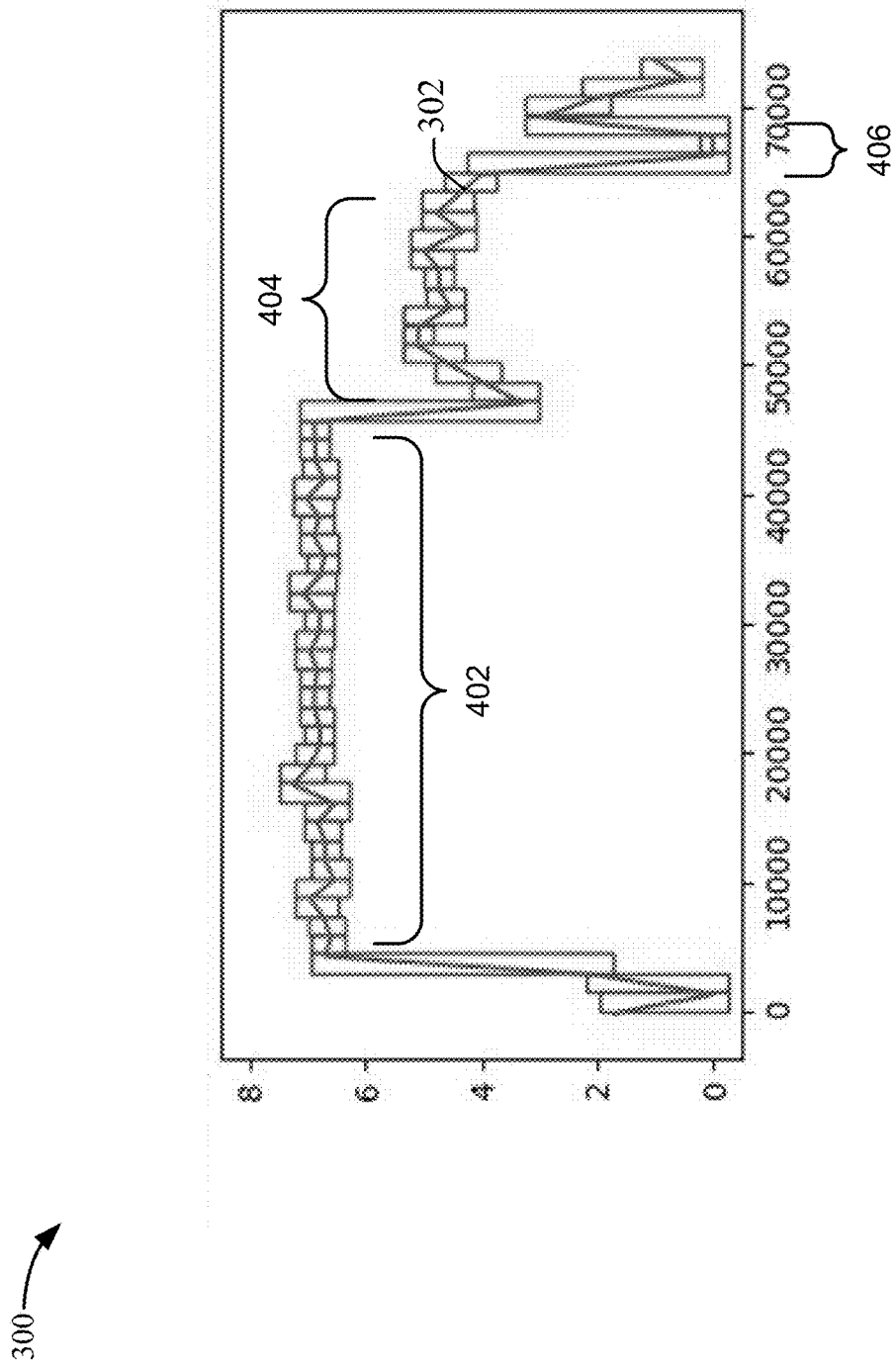
FIG. 4 highlights different portions of the entropy profile according to some embodiments.

At 206, malware detection system 102 analyzes the entropy profile to generate a rule. For example, entropy values at multiple slices in the file may be determined and used to generate sub-rules for slices. The generation of sub-rules will be described in more detail in FIG. 4 and FIG. 5. A slice may be a range of positions, but could also be a single position. In some embodiments, each sub-rule may include one or more entropy values, which may be a range of entropy values that is used to determine whether the entropy of a slice in another file matches the sub-rule. In some embodiments, malware detection system 102 may receive the entropy profile and generate the rule automatically. For example, malware detection system 102 may be configured to analyze the entropy profile at multiple slices. Then, malware detection system 102 uses the entropy values in the slice to generate the range of entropy values for the slice. The range may be generated in different ways, such as the range is based a minimum and maximum entropy value in the slice. Also, the entropy value may be a single value, such as an average, median value, etc. for the slice. Other methods may also be used to generate the range, such as analyzing the rate of change of the entropy values in the slice. When the entropy values are changing with a greater variance in a slice, the range may be increased. However, when the entropy values are not changing over the slice, then the range may be reduced.

At 208 malware detection system 102 deploys the rule. For example, malware detection system 102 may either deploy the rule to production or test the rule to determine whether the rule detects malicious files without a number of false positives. After testing, malware detection system 102 may use the rule to detect malicious files. This process will be described in more detail in FIG. 6.

Figure 3:
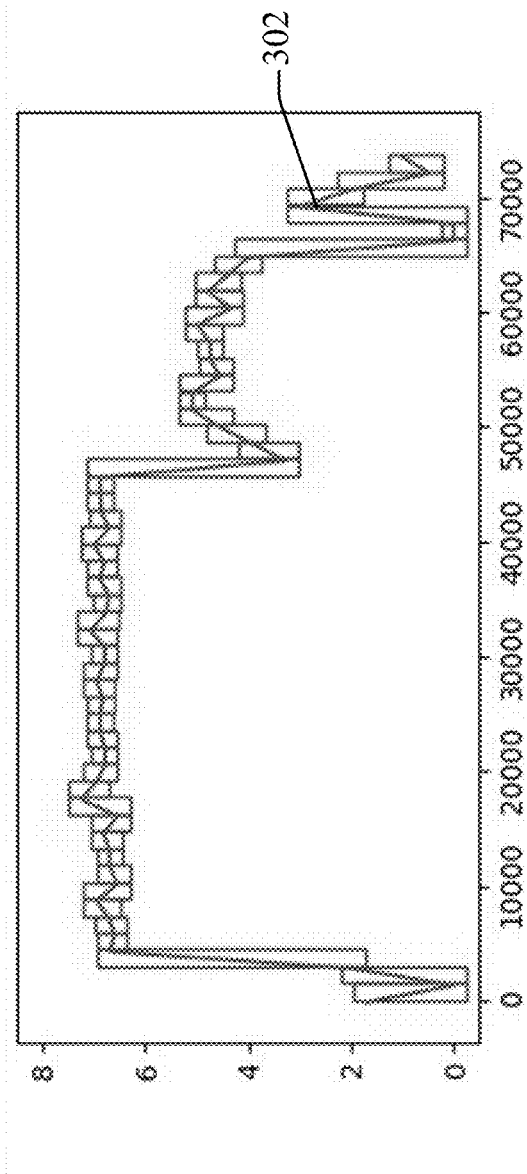
FIG. 3 depicts a graph of an entropy profile according to some embodiments.

FIG. 3 depicts a graph 300 of an entropy profile according to some embodiments. The Y axis depicts the entropy value and the X axis depicts positions in the file, such as file offsets. A file offset may be a byte position of data within the file. A line 302 may represent the entropy profile across positions in the file.

In this example, the entropy scale may be within the range 0 to 8. The value of zero represents no randomness in that all the bytes of data have the same value, such as within a window of a number of bytes, the data has the same values. The value of eight represents the maximum entropy, which may be a truly random string within the window. As discussed above, English text may have an entropy value between 3.5 and 5, which may be the value when a software code is found in the window. A value of 7.5 or above may mean that the data is encoded (e.g., encrypted or compressed) within the window. In the entropy profile, the entropy values may vary over the positions of the file depending on the randomness of the data.

If the same packing method is used for multiple files, the entropy profile may be similar for all the files even if the files include some changed data. That is, the entropy profile shown in FIG. 3 may be similar for all the files (within a small threshold). This is because the data is similar and the packing method encodes the data with the same packing method. This results in an entropy profile that is similar (within a threshold). Because the data is encoded, the small variations in the data still result in a similar entropy profile that can be detected using a range of entropy values.

Figure 5:
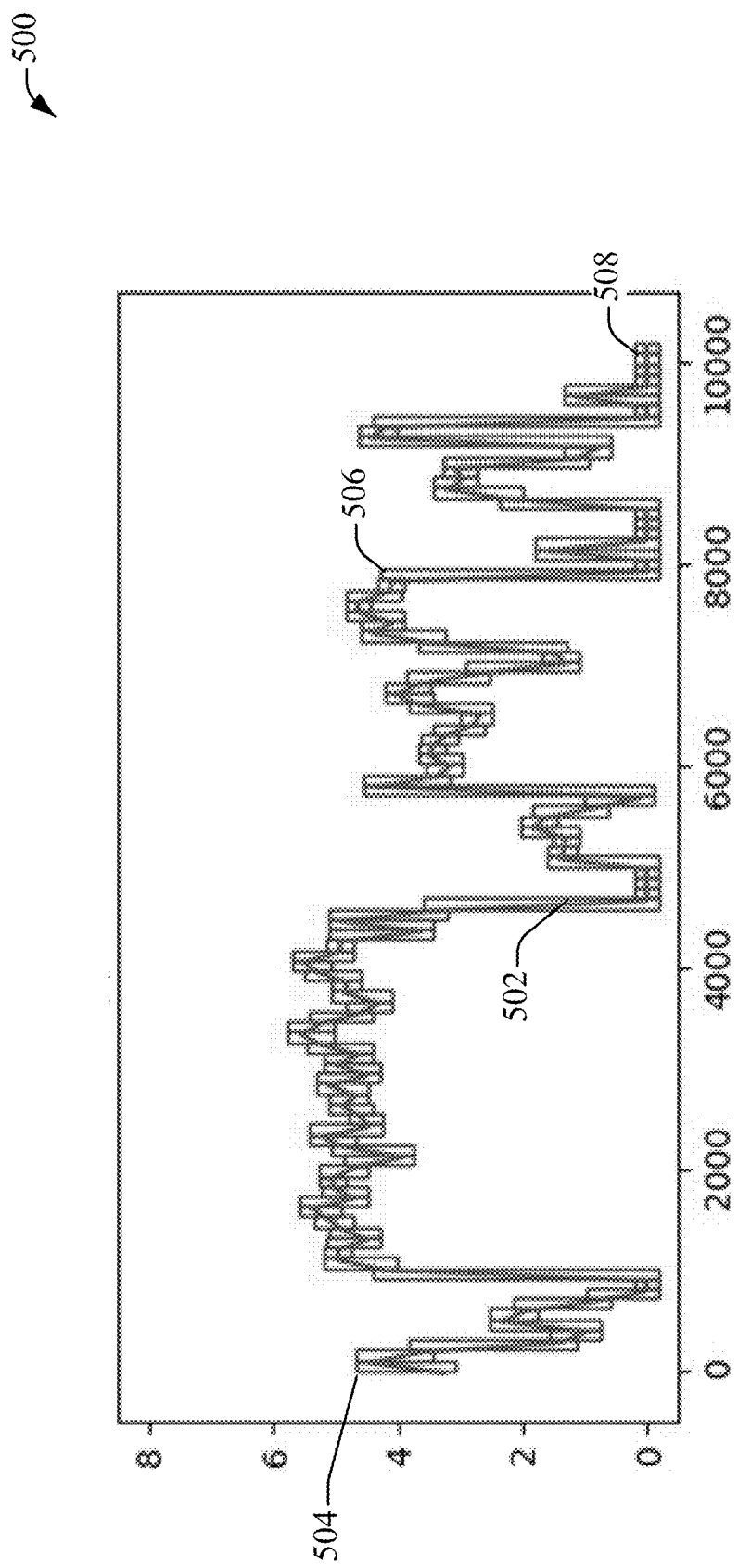
FIG. 5 depicts an example of a graph using slices of the entropy profile according to some embodiment.

There may be interesting parts of the entropy profile that can be associated with different data. For example, FIG. 4 highlights different portions of the entropy profile in graph 300 according to some embodiments. The different portions may include portions 402, 404, and 406. Portion 402 may have a consistent high entropy value, which may indicate compressed or encrypted data. Portion 404 may be a middle part of the file that may include software code that performs the unpacking of a file. Then at the end of the file, portion 406 may include a number of values that repeat, which may be padding. The entropy profile shown may result when the same packing method is used to pack multiple files that may include some different data, but generally perform the same function. The above portions may be used to detect interesting parts of the entropy file and generate slices from the portions. These slices may be used to detect other files that have the same interesting portions, which may detect malicious files that have been packed in the same way. For example, FIG. 5 depicts an example of a graph 500 using slices of the entropy profile according to some embodiment. An entropy curve 502 may include multiple values across the positions of the file. Multiple slices are shown as the boxes.

For each slice, malware detection system 102 may generate a sub-rule. For example, at 504, malware detection system 102 may generate a range of values based on the entropy values found in the slice. In this slice, malware detection system 102 may determine that the sub-rule includes the range of around 3.5 to 4.3 for the entropy values. Also, another sub-rule may be generated based on the slice at 506. In this slice, the entropy values may be from the range of 0 to 4.3. The ranges for other slices may be determined similarly by taking a minimum and maximum value for the entropy values found in the slices. Also at 508, there is a slice with the entropy range value of zero. There may be many slices like this at the end of curve 502. Other methods may also be used to determine the range of entropy values, such as determining an average of the entropy values in the slice.

Accordingly, malware detection system 102 generates sub-rules. In one example, if the slices cover 100 bytes, then, a sub-rule for slice 504 may be when the entropy profile at the position from 0 to 100 equals 3.5 to 4.3. Also, the sub-rule for the slice at 506 may be when the entropy values at the positions around 7800-7900 are between 0 to 4.3. At 508, the entropy value may be zero for the sub-rule.

The amount of bytes that are included in each slice may be configurable. For example, for a rule that is more granular, the amount of bytes in each slice may be smaller, whereas when the rule is less granular, the amount of bytes found in the slice may be greater. The less granular the slice, the more false positives may result.

Once the rule is generated, a rule may be used to detect malicious files.

Detection Process

Figure 6:
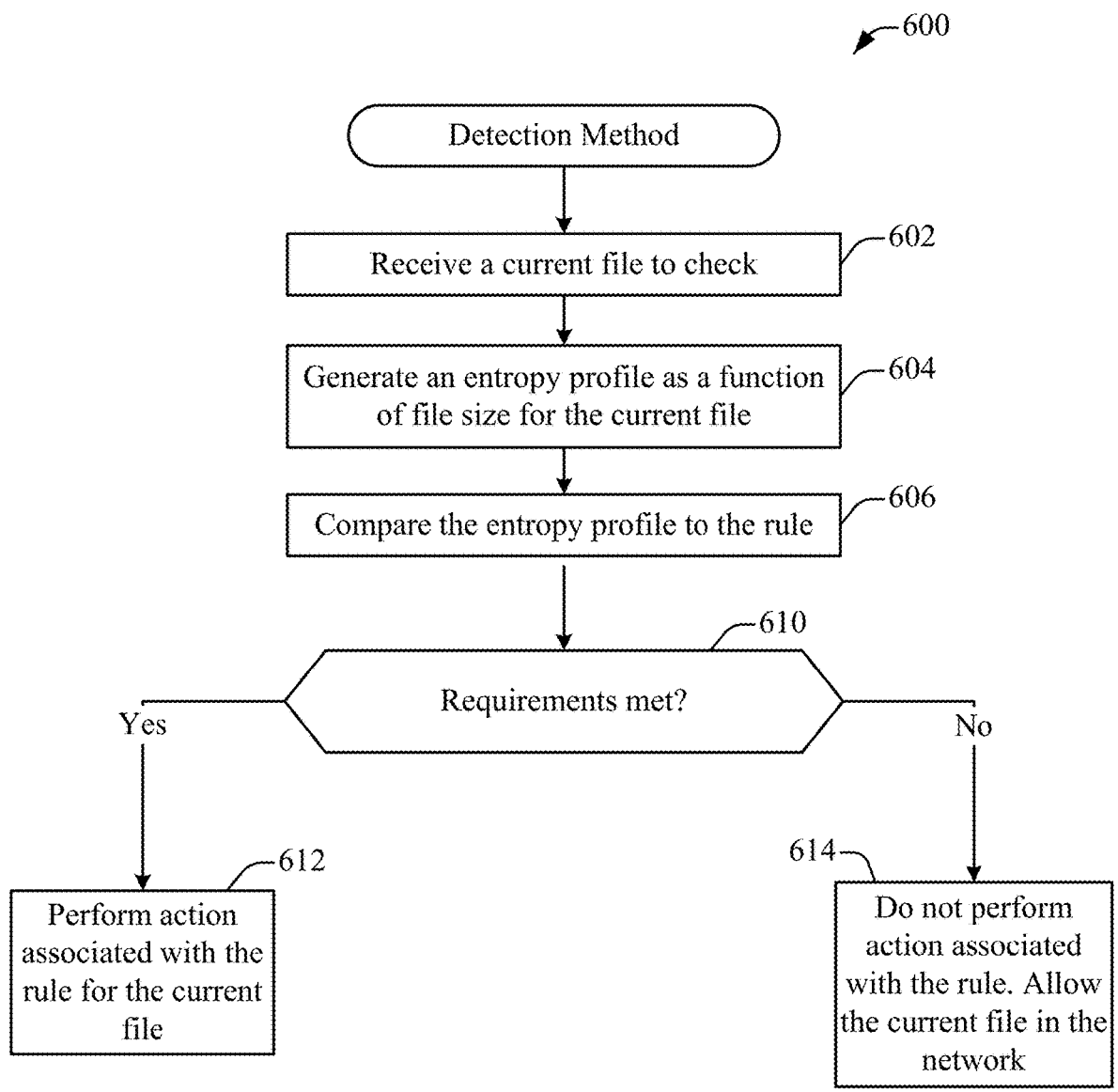
FIG. 6 depicts a simplified flowchart of a method for detecting malicious files according to some embodiments.

FIG. 6 depicts a simplified flowchart 600 of a method for detecting malicious files according to some embodiments. At 602, malware detection system 102 receives a current file to check. For example, malware detection system 102 may check files that are received at an ingress point of a network, such as when uploaded to services 106.

At 604, malware detection system 102 generates an entropy profile as a function of file size for the current file. As described above, the entropy profile may measure entropy values for multiple slices of the current file.

At 606, malware detection system 102 may compare the entropy profile to the rule. At some embodiments, malware detection system 102 may analyze slices of the entropy profile, and compares the values for the slices to the sub-rules for the respective slices. For example, the entropy profile may be broken up into slices. Then, the entropy values for the slices are determined, and compared to the sub-rule for the slice. If the minimum and maximum entropy values of slices are being used, then malware detection system 102 determines the minimum and maximum entropy values for the slices. If the entropy value for the slice of the entropy profile meets the threshold found in the sub-rule for the slice, then the sub-rule requirements may be met. In some examples, if the sub-rule includes the thresholds of a range of 3.5 to 4.3, and all entropy values for the slice in the entropy profile are within the range, the rule may be met. In other embodiments, a threshold of a number of the entropy values in the slice may need to be between the range, have a certain percentage between the range, or other methods may be used.

At 610, malware detection system 102 determines if the requirements for the rule are met. Different methods may be used to determine if the requirements are met. For example, the requirements may be met if a certain percentage of sub-rules for slices may be met. In some embodiments, if 95% of the sub-rules for slices have been met by slices in the entropy profile, then malware detection system 102 may determine the requirements have been met. That is, malware detection system 102 determines that the current file may be malicious because it has a similar entropy profile (within a threshold) as the malicious file that was used to generate the rule.

If the requirements are met, at 612, malware detection system 102 performs an action associated with the rule for the current file. For example, the current file may be quarantined from the network. Other remedial actions may also be performed.

If the requirements are not met, at 614, malware detection system 102 may not perform an action associated with the rule. For example, the file may be allowed on the network if no other rules are met and not quarantined.

Figure 7:
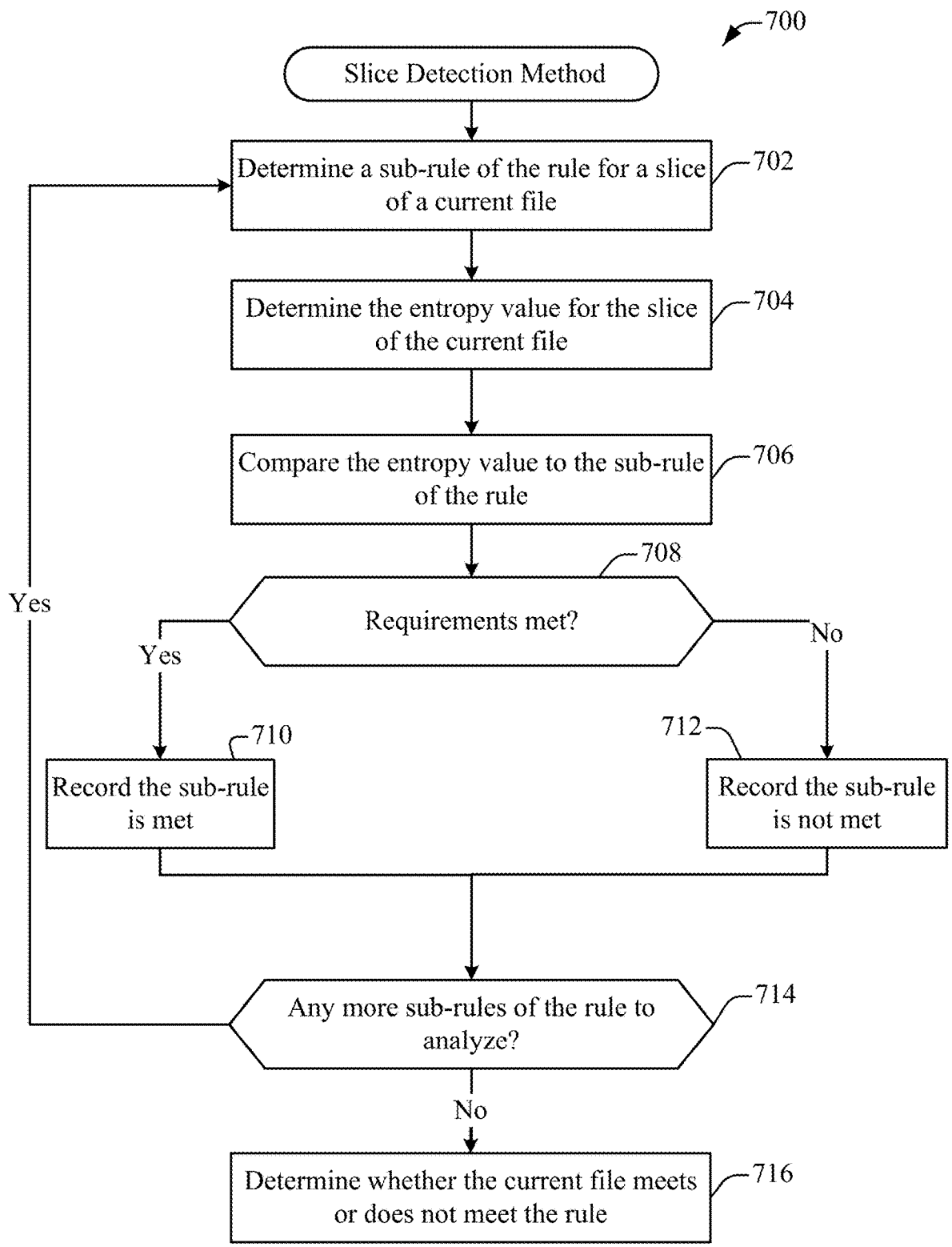
FIG. 7 depicts a simplified flowchart for analyzing slices of the rule according to some embodiments.

The use of slices to detect malicious files will now be described in more detail. FIG. 7 depicts a simplified flowchart 700 for analyzing slices of the rule according to some embodiments. At 702, malware detection system 102 determines a sub-rule of the rule for a slice of the current file. Each sub-rule and slice may be analyzed. At 704, malware detection system 102 determines the entropy value for the slice of the file. The entropy value that is determined may correspond to a file offset that is associated with this slice. One or more entropy values may be determined, such as the minimum and the maximum values for the entropy values within the file offsets for the slice. In other examples, a single entropy value for a file offset is associated with the slice, such as the average values for entropy values in the slice may be determined.

At 706, malware detection system 102 compares the entropy value to the sub-rule of the rule. For example, malware detection system 102 determines if the entropy value meets the threshold of the rule. If the range for the sub-rule is 3.8 to 4.3, and the entropy value for the slice is 4.0, then the sub-rule is met. However, if the entropy value is 3.0, then, the sub-rule is not met.

At 708, malware detection system 102 determines if the requirements for the sub-rule have been met. If the requirements have been met, at 710, malware detection system 102 records that the sub-rule is met. If the requirements have not been met, at 712, malware detection system 102 records the sub-rule is not met.

At 714, malware detection system 102 determines if any more sub-rules of the rule still need to be analyzed. If so, the process reiterates the 702 where another sub-rule for another slice of the file is determined. For example, malware detection system 102 may analyze the slices of the current file sequentially.

Once all the slices have been analyzed, at 716, malware detection system 102 determines whether the current file meets the rule. As discussed above, malware detection system 102 may determine a percentage of sub-rules that have been met. For example, malware detection system 102 may have a threshold such as 95% of these sub-rules that must be met to pass the rule. If the current file meets the rule, then the file is quarantined. If the current file does not meet the rule, then malware detection system 102 may not perform an action and may allow the current file onto the network. In some examples, meeting the rule may be considered failing a security test and not meeting the rule may be considered passing the security test.

CONCLUSION

Accordingly, malware detection system 102 is improved in that files that may normally not be detected as malicious may be detected using the entropy profile. Also, the use of the entropy profile may detect a large number of files that may be generated using the same packing method. For example, when a malicious actor may pack multiple files that may have some different data within them using the same packing method, malware detection system 102 may use the entropy profile to detect all of these files using the same rule. Previously, a single rule for every file may have been needed. This increases the storage requirements and also the computing resources needed to generate these rules. By using a single rule that can detect multiple files that are generated using the same packing method, the storage of the rules is decreased and also the amount of computing resources used is decreased. Also, the percentage of malicious files that may be detected may also be increased.

Figure 8:
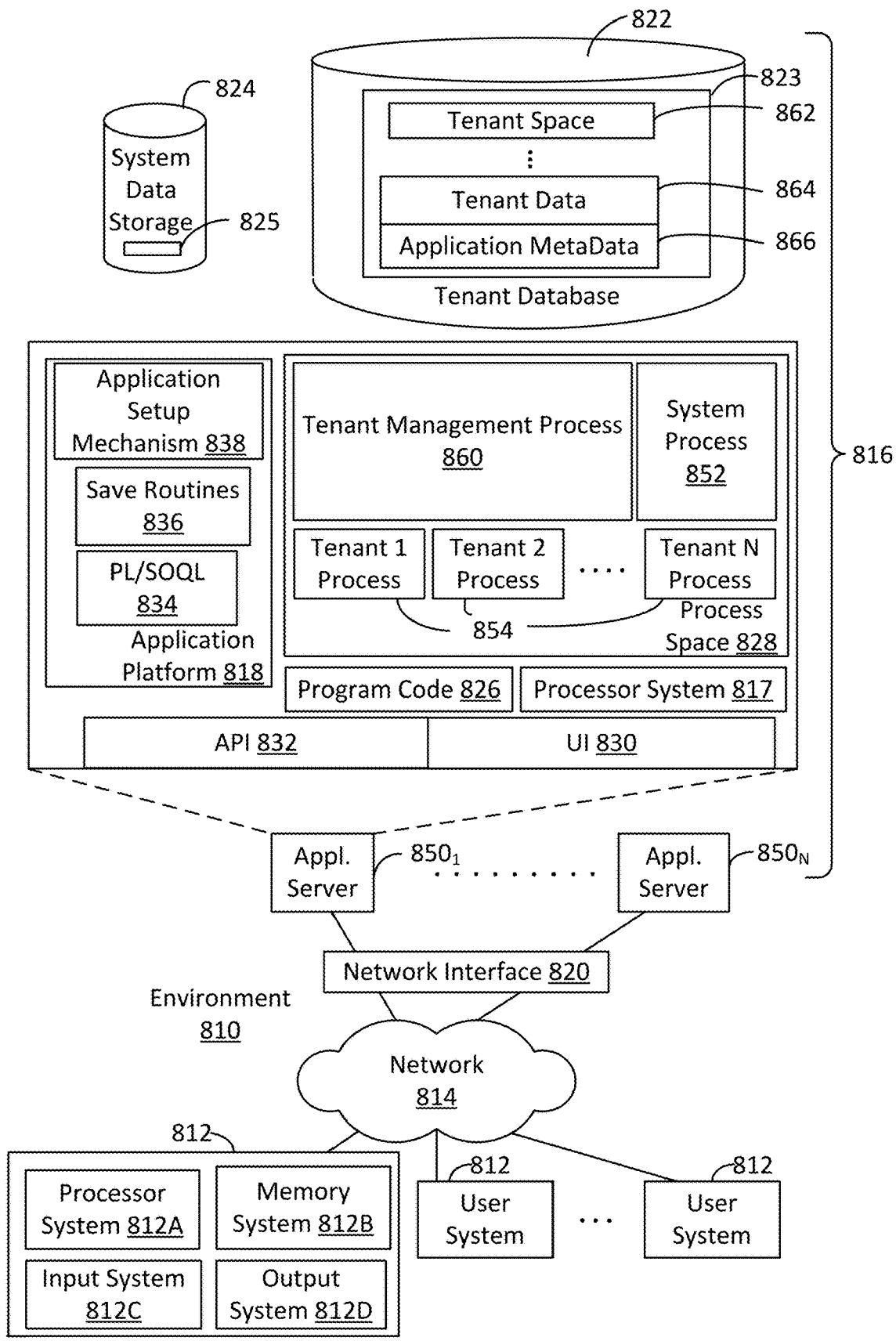
FIG. 8 shows a block diagram of an example of an environment that includes an on-demand database service configured in accordance with some implementations.

FIG. 8 shows a block diagram of an example of an environment 810 that includes an on-demand database service configured in accordance with some implementations. Environment 810 may include user systems 812, network 814, database system 816, processor system 817, application platform 818, network interface 820, tenant data storage 822, tenant data 823, system data storage 824, system data 825, program code 826, process space 828, User Interface (UI) 830, Application Program Interface (API) 832, PL/SOQL 834, save routines 836, application setup mechanism 838, application servers 850-1 through 850-N, system process space 852, tenant process spaces 854, tenant management process space 860, tenant storage space 862, user storage 864, and application metadata 866. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 816, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 818 may be a framework that allows the creation, management, and execution of applications in system 816. Such applications may be developed by the database service provider or by users or third-party application developers accessing the service. Application platform 818 includes an application setup mechanism 838 that supports application developers' creation and management of applications, which may be saved as metadata into tenant data storage 822 by save routines 836 for execution by subscribers as one or more tenant process spaces 854 managed by tenant management process 860 for example. Invocations to such applications may be coded using PL/SOQL 834 that provides a programming language style interface extension to API 832. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 866 for a subscriber making such an invocation. Such system processes may also manage execution of application metadata 866 as an application in a virtual machine.

In some implementations, each application server 850 may handle requests for any user associated with any organization. A load balancing function (e.g., an F5 Big-IP load balancer) may distribute requests to the application servers 850 based on an algorithm such as least-connections, round robin, observed response time, etc. Each application server 850 may be configured to communicate with tenant data storage 822 and the tenant data 823 therein, and system data storage 824 and the system data 825 therein to serve requests of user systems 812. The tenant data 823 may be divided into individual tenant storage spaces 862, which can be either a physical arrangement and/or a logical arrangement of data. Within each tenant storage space 862, user storage 864 and application metadata 866 may be similarly allocated for each user. For example, a copy of a user's most recently used (MRU) items might be stored to user storage 864. Similarly, a copy of MRU items for an entire tenant organization may be stored to tenant storage space 862. A UI 830 provides a user interface and an API 832 provides an application programming interface to system 816 resident processes to users and/or developers at user systems 812.

System 816 may implement a web-based malware detection system. For example, in some implementations, system 816 may include application servers configured to implement and execute malware detection system software applications. The application servers may be configured to provide related data, code, forms, web pages and other information to and from user systems 812. Additionally, the application servers may be configured to store information to, and retrieve information from a database system. Such information may include related data, objects, and/or Webpage content. With a multi-tenant system, data for multiple tenants may be stored in the same physical database object in tenant data storage 822, however, tenant data may be arranged in the storage medium(s) of tenant data storage 822 so that data of one tenant is kept logically separate from that of other tenants. In such a scheme, one tenant may not access another tenant's data, unless such data is expressly shared.

Several elements in the system shown in FIG. 8 include conventional, well-known elements that are explained only briefly here. For example, user system 812 may include processor system 812A, memory system 812B, input system 812C, and output system 812D. A user system 812 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 812 to access, process and view information, pages and applications available from system 816 over network 814. Network 814 may be any network or combination of networks of devices that communicate with one another, such as any one or any combination of a LAN (local area network), WAN (wide area network), wireless network, or other appropriate configuration.

The users of user systems 812 may differ in their respective capacities, and the capacity of a particular user system 812 to access information may be determined at least in part by "permissions" of the particular user system 812. As discussed herein, permissions generally govern access to computing resources such as data objects, components, and other entities of a computing system, such as a malware detection system, a social networking system, and/or a CRM database system. "Permission sets" generally refer to groups of permissions that may be assigned to users of such a computing environment. For instance, the assignments of users and permission sets may be stored in one or more databases of System 816. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 816 may provide on-demand database service to user systems 812 using an MTS arrangement. By way of example, one tenant organization may be a company that employs a sales force where each salesperson uses system 816 to manage their sales process. Thus, a user in such an organization may maintain contact data, leads data, customer follow-up data, performance data, goals and progress data, etc., all applicable to that user's personal sales process (e.g., in tenant data storage 822). In this arrangement, a user may manage his or her sales efforts and cycles from a variety of devices, since relevant data and applications to interact with (e.g., access, view, modify, report, transmit, calculate, etc.) such data may be maintained and accessed by any user system 812 having network access.

When implemented in an MTS arrangement, system 816 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 816 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 816 may also maintain system-level data usable by multiple tenants or other data. Such system-level data may include industry reports, news, postings, and the like that are sharable between tenant organizations.

In some implementations, user systems 812 may be client systems communicating with application servers 850 to request and update system-level and tenant-level data from system 816. By way of example, user systems 812 may send one or more queries requesting data of a database maintained in tenant data storage 822 and/or system data storage 824.

An application server 850 of system 816 may automatically generate one or more SQL statements (e.g., one or more SQL queries) that are designed to access the requested data. System data storage 824 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 9A:
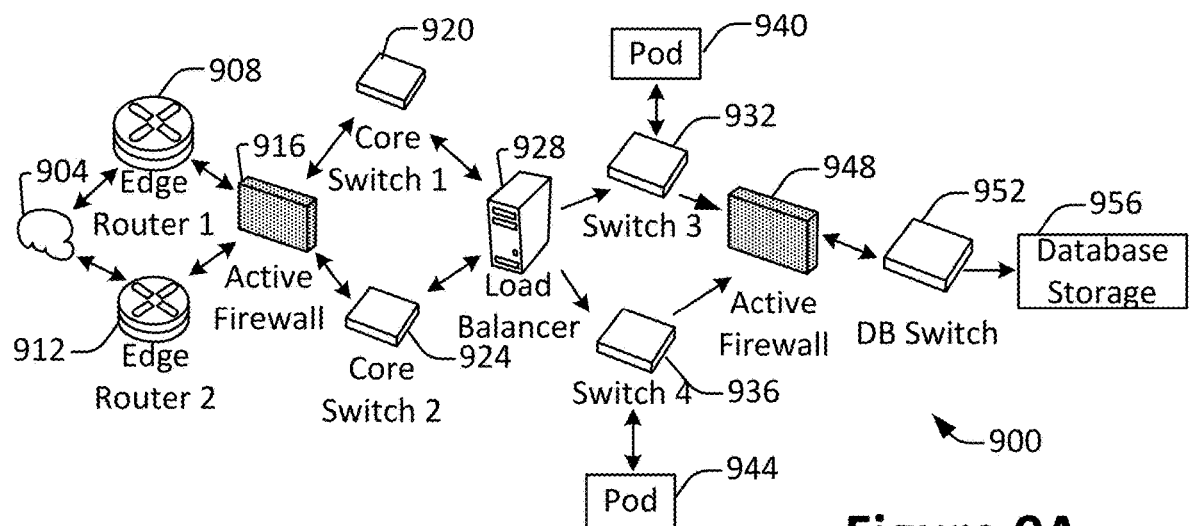
FIG. 9A shows a system diagram of an example of architectural components of an on-demand database service environment, configured in accordance with some implementations.

FIG. 9A shows a system diagram of an example of architectural components of an on-demand database service environment 900, configured in accordance with some implementations. A client machine located in the cloud 904 may communicate with the on-demand database service environment via one or more edge routers 908 and 912. A client machine may include any of the examples of user systems 812 described above. The edge routers 908 and 912 may communicate with one or more core switches 920 and 924 via firewall 916. The core switches may communicate with a load balancer 928, which may distribute server load over different pods, such as the pods 940 and 944 by communication via pod switches 932 and 936. The pods 940 and 944, which may each include one or more servers and/or other computing resources, may perform data processing and other operations used to provide on-demand services. Components of the environment may communicate with a database storage 956 via a database firewall 948 and a database switch 952.

Accessing an on-demand database service environment may involve communications transmitted among a variety of different components. The environment 900 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 9A and 9B.

The cloud 904 refers to any suitable data network or combination of data networks, which may include the Internet. Client machines located in the cloud 904 may communicate with the on-demand database service environment 900 to access services provided by the on-demand database service environment 900. By way of example, client machines may access the on-demand database service environment 900 to retrieve, store, edit, and/or process malware detection system information.

In some implementations, the edge routers 908 and 912 route packets between the cloud 904 and other components of the on-demand database service environment 900. The edge routers 908 and 912 may employ the Border Gateway Protocol (BGP). The edge routers 908 and 912 may maintain a table of IP networks or 'prefixes', which designate network reachability among autonomous systems on the internet.

In one or more implementations, the firewall 916 may protect the inner components of the environment 900 from internet traffic. The firewall 916 may block, permit, or deny access to the inner components of the on-demand database service environment 900 based upon a set of rules and/or other criteria. The firewall 916 may act as one or more of a packet filter, an application gateway, a stateful filter, a proxy server, or any other type of firewall.

In some implementations, the core switches 920 and 924 may be high-capacity switches that transfer packets within the environment 900. The core switches 920 and 924 may be configured as network bridges that quickly route data between different components within the on-demand database service environment. The use of two or more core switches 920 and 924 may provide redundancy and/or reduced latency.

In some implementations, communication between the pods 940 and 944 may be conducted via the pod switches 932 and 936. The pod switches 932 and 936 may facilitate communication between the pods 940 and 944 and client machines, for example via core switches 920 and 924. Also or alternatively, the pod switches 932 and 936 may facilitate communication between the pods 940 and 944 and the database storage 956. The load balancer 928 may distribute workload between the pods, which may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948, which may act as a computer application firewall operating at the database application layer of a protocol stack. The database firewall 948 may protect the database storage 956 from application attacks such as structure query language (SQL) injection, database rootkits, and unauthorized information disclosure. The database firewall 948 may include a host using one or more forms of reverse proxy services to proxy traffic before passing it to a gateway router and/or may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, the database storage 956 may be an on-demand database system shared by many different organizations. The on-demand database service may employ a single-tenant approach, a multi-tenant approach, a virtualized approach, or any other type of database approach. Communication with the database storage 956 may be conducted via the database switch 952. The database storage 956 may include various software components for handling database queries. Accordingly, the database switch 952 may direct database queries transmitted by other components of the environment (e.g., the pods 940 and 944) to the correct components within the database storage 956.

Figure 9B:
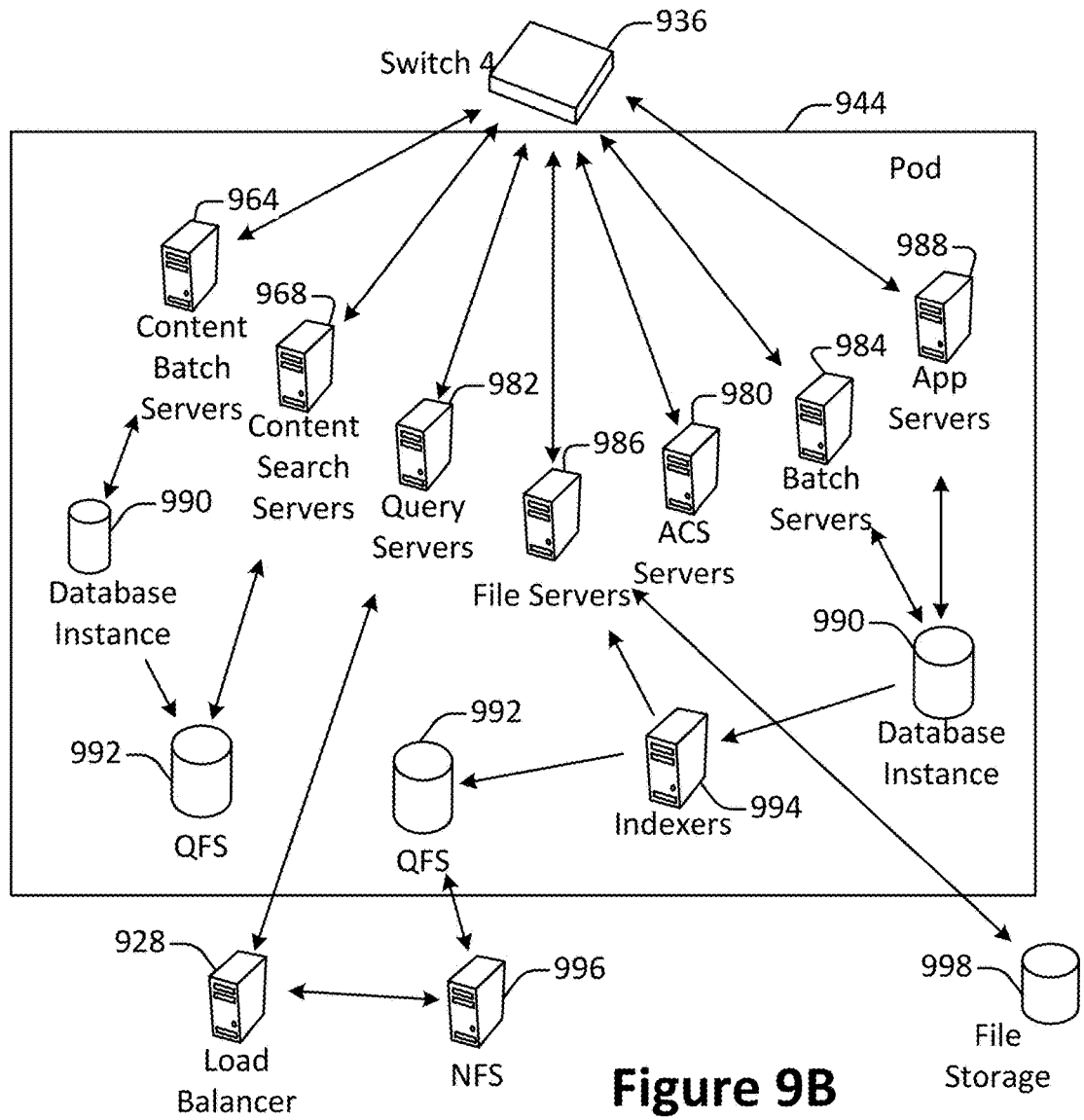
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to user(s) of the on-demand database service environment 900. The pod 944 may include one or more content batch servers 964, content search servers 968, query servers 982, file servers 986, access control system (ACS) servers 980, batch servers 984, and app servers 988. Also, the pod 944 may include database instances 990, quick file systems (QFS) 992, and indexers 994. Some or all communication between the servers in the pod 944 may be transmitted via the switch 936.

In some implementations, the app servers 988 may include a framework dedicated to the execution of procedures (e.g., programs, routines, scripts) for supporting the construction of applications provided by the on-demand database service environment 900 via the pod 944. One or more instances of the app server 988 may be configured to execute all or a portion of the operations of the services described herein.

In some implementations, as discussed above, the pod 944 may include one or more database instances 990. A database instance 990 may be configured as an MTS in which different organizations share access to the same database, using the techniques described above. Database information may be transmitted to the indexer 994, which may provide an index of information available in the database 990 to file servers 986. The QFS 992 or other suitable file system may serve as a rapid-access file system for storing and accessing information available within the pod 944. The QFS 992 may support volume management capabilities, allowing many disks to be grouped together into a file system. The QFS 992 may communicate with the database instances 990, content search servers 968 and/or indexers 994 to identify, retrieve, move, and/or update data stored in the network file systems (NFS) 996 and/or other storage systems.

In some implementations, one or more query servers 982 may communicate with the NFS 996 to retrieve and/or update information stored outside of the pod 944. The NFS 996 may allow servers located in the pod 944 to access information over a network in a manner similar to how local storage is accessed. Queries from the query servers 922 may be transmitted to the NFS 996 via the load balancer 928, which may distribute resource requests over various resources available in the on-demand database service environment 900. The NFS 996 may also communicate with the QFS 992 to update the information stored on the NFS 996 and/or to provide information to the QFS 992 for use by servers located within the pod 944.

In some implementations, the content batch servers 964 may handle requests internal to the pod 944. These requests may be long-running and/or not tied to a particular customer, such as requests related to log mining, cleanup work, and maintenance tasks. The content search servers 968 may provide query and indexer functions such as functions allowing users to search through content stored in the on-demand database service environment 900. The file servers 986 may manage requests for information stored in the file storage 998, which may store information such as documents, images, basic large objects (BLOBs), etc. The query servers 982 may be used to retrieve information from one or more file systems. For example, the query system 982 may receive requests for information from the app servers 988 and then transmit information queries to the NFS 996 located outside the pod 944. The ACS servers 980 may control access to data, hardware resources, or software resources called upon to render services provided by the pod 944. The batch servers 984 may process batch jobs, which are used to run tasks at specified times. Thus, the batch servers 984 may transmit instructions to other servers, such as the app servers 988, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 10:
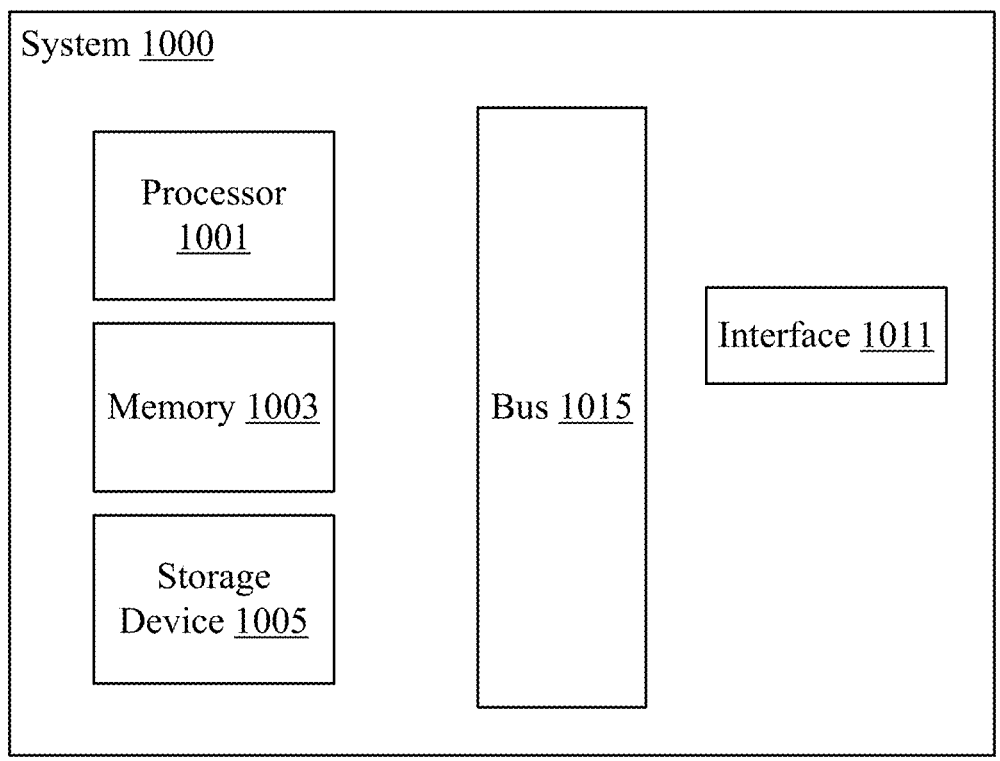
FIG. 10 illustrates one example of a computing device.

FIG. 10 illustrates one example of a computing device. According to various embodiments, a system 1000 suitable for implementing embodiments described herein includes a processor 1001, a memory module 1003, a storage device 1005, an interface 1011, and a bus 1015 (e.g., a PCI bus or other interconnection fabric.) System 1000 may operate as variety of devices such as an application server, a database server, or any other device or service described herein. Although a particular configuration is described, a variety of alternative configurations are possible. The processor 1001 may perform operations such as those described herein. Instructions for performing such operations may be embodied in the memory 1003, on one or more non-transitory computer readable media, or on some other storage device. Various specially configured devices can also be used in place of or in addition to the processor 1001. The interface 1011 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
receiving a file, wherein the file is packed using a packing method;
generating an entropy profile for the file, wherein the entropy profile describes an entropy of data over positions in the file;
generating a rule to detect the entropy profile of the file by analyzing entropy values from the entropy profile in a plurality of slices in the file;
outputting the rule, wherein the rule is usable to detect in other files that use the packing method based on analyzing entropy in slices of the other files;
receiving a current file;
generating an entropy profile of the current file; and
comparing the entropy profile to the rule to determine if the current file matches the rule, wherein comparing comprises:
determining entropy values for the plurality of slices of the entropy profile of the current file;

comparing a plurality of sub-rules for the rule to entropy values for slices in the plurality of slices; and
determining whether the current file matches the rule based on the comparing.

2. The method of claim 1, wherein the packing method is configured to encode the data in the file.

3. The method of claim 1, wherein generating the entropy profile for the file comprises:
analyzing an entropy of data of the file to generate the entropy profile.

4. The method of claim 1, further comprising:
analyzing a portion of the entropy profile for respective slices in the plurality of slices of the file to generate entropy values for respective slices.

5. The method of claim 4, wherein generating the rule comprises:
generating a sub-rule based on the entropy values for respective slices in the plurality of slices to generate the plurality of sub-rules for the rule.

6. The method of claim 5, wherein sub-rules in the plurality of sub-rules comprise one or more entropy values based on respective entropy values found in corresponding slices for the sub-rules.

7. The method of claim 6, wherein the one or more entropy values comprise a range of entropy values.

8. The method of claim 7, wherein the range of entropy values is based on a minimum value and a maximum value for the entropy values in the respective slice.

9. The method of claim 1, wherein a size of slices in the plurality of slices is determined based on pre-set sizes of the file.

10. The method of claim 1, wherein:
a size of the slices in the plurality of slices is based on an analysis of entropy values in the entropy profile for respective slices, and
the size of at least two slices is different.

11. The method of claim 1, further comprising:
deploying the rule to a detection service that uses the rule to check whether the other files match the rule.

12. The method of claim 1, further comprising:
performing an action associated with the rule when the current file matches the rule; and
not performing the action associated with the rule when the current file does not match the rule.

13. The method of claim 1, wherein the current file matches the rule when a threshold of slices of the current file match respective sub-rules.

14. A non-transitory computer-readable storage medium having stored thereon computer executable instructions, which when executed by a computing device, cause the computing device to be operable for:
receiving a file, wherein the file is packed using a packing method;
generating an entropy profile for the file, wherein the entropy profile describes an entropy of data over positions in the file;
generating a rule to detect the entropy profile of the file by analyzing entropy values from the entropy profile in a plurality of slices in the file; and
outputting the rule, wherein the rule is usable to detect in other files that use the packing method based on analyzing entropy in slices of the other files;
receiving a current file;
generating an entropy profile of the current file; and
comparing the entropy profile to the rule to determine if the current file matches the rule, wherein comparing comprises;
determining entropy values for the plurality of slices of the entropy profile of the current file;
comparing a plurality of sub-rules for the rule to entropy values for slices in the plurality of slices; and
determining whether the current file matches the rule based on the comparing.

15. The non-transitory computer-readable storage medium of claim 14, wherein the packing method is configured to encode the data in the file.

16. The non-transitory computer-readable storage medium of claim 14, wherein generating the entropy profile for the file comprises:
analyzing an entropy of data of the file to generate the entropy profile.

17. The non-transitory computer-readable storage medium of claim 14, wherein:
a size of the slices in the plurality of slices is based on an analysis of entropy values in the entropy profile for respective slices, and
the size of at least two slices is different.

18. A method comprising:
receiving a first file, wherein the first file is packed using a packing method;
generating a rule to detect a first entropy profile of the first file by analyzing entropy values from the first entropy profile in a plurality of slices of the first file;
receiving a second file;
generating a second entropy profile of the second file;
comparing the second entropy profile to the rule to determine if the second file uses the packing method, wherein comparing comprises;
determining entropy values for the plurality of slices of the second entropy profile of the second file;
comparing a plurality of sub-rules for the rule to entropy values for slices in the plurality of slices; and
determining whether the second file matches the rule based on the comparing;
performing an action associated with the rule when the second file matches the rule; and
not performing the action associated with the rule when the second file does not match the rule.

19. The method of claim 18, wherein sub-rules in the plurality of sub-rules comprise one or more entropy values based on respective entropy values found in corresponding slices for the sub-rules in the first file.

20. The method of claim 19, wherein the second file matches the rule when a threshold of slices of the second file match respective sub-rules.

* * * * *